(12) United States Patent
Oh et al.

(10) Patent No.: US 9,411,189 B2
(45) Date of Patent: Aug. 9, 2016

(54) LIQUID CRYSTAL CELL

(75) Inventors: Dong Hyun Oh, Daejeon (KR); Kyung Jun Kim, Daejeon (KR); Sung Joon Min, Daejeon (KR); Jung Sun You, Daejeon (KR)

(73) Assignee: LG CHEM, LTD., Seoul (KR)

( * ) Notice: Subject to any disclaimer, the term of this patent is extended or adjusted under 35 U.S.C. 154(b) by 0 days.

(21) Appl. No.: 13/601,628

(22) Filed: Aug. 31, 2012

(65) Prior Publication Data

US 2013/0201435 A1 Aug. 8, 2013

(30) Foreign Application Priority Data

Aug. 31, 2011 (KR) .......................... 10-2011-0087945
Aug. 31, 2012 (KR) .......................... 10-2012-0096135

(51) Int. Cl.
| G02F 1/1334 | (2006.01) |
| C09K 19/54 | (2006.01) |
| C09K 19/52 | (2006.01) |
| G02F 1/137 | (2006.01) |

(52) U.S. Cl.
CPC .............. *G02F 1/1334* (2013.01); *C09K 19/52* (2013.01); *C09K 2019/546* (2013.01); *G02F 1/13725* (2013.01); *G02F 2001/13345* (2013.01)

(58) Field of Classification Search
CPC .. C09K 19/52; C09K 19/2019; C09K 19/544; C09K 19/546; G02F 1/1334; G02F 1/2001; G02F 1/13345; G02F 1/13725
USPC ................... 349/183, 186; 252/299.01, 299.5
See application file for complete search history.

(56) References Cited

U.S. PATENT DOCUMENTS

| 5,892,560 | A | 4/1999 | Yoshida et al. |
| 7,102,706 | B2 * | 9/2006 | Kim ...................... G02F 1/1334 349/88 |
| 9,182,624 | B2 * | 11/2015 | Min et al. .............. G02F 1/1334 349/186 |
| 2002/0067329 | A1 * | 6/2002 | Toko et al. ...................... 345/94 |
| 2002/0113920 | A1 * | 8/2002 | Kubota et al. ................... 349/86 |
| 2002/0126233 | A1 * | 9/2002 | Yamagishi ........ G02F 1/136277 349/43 |
| 2007/0102668 | A1 | 5/2007 | Oh |
| 2011/0240920 | A1 * | 10/2011 | Kilickiran et al. ....... 252/299.63 |

FOREIGN PATENT DOCUMENTS

| CN | 1330777 A | 1/2002 |
| CN | 102099432 A | 6/2011 |

(Continued)

OTHER PUBLICATIONS

Office Action issued in Taiwanese Patent Appln. No. 101131730 on Dec. 17, 2014 with English translation, 11 pages.

(Continued)

*Primary Examiner* — Shean C Wu
(74) *Attorney, Agent, or Firm* — Rothwell, Figg, Ernst & Manbeck, P.C.

(57) ABSTRACT

A liquid crystal cell, a precursor of the liquid crystal layer, a method of manufacturing a liquid crystal cell, and use of the liquid crystal cell are provided. The liquid crystal cell may be manufactured simply in a consecutive manner using a roll-to-roll process. Also, the liquid crystal cell may be realized as a flexible device, and have an excellent contrast ratio. Such a liquid crystal cell can be applied in various applications including smart windows, window-protecting films, flexible display devices, active retarders for displaying 3D images, or viewing angle-adjusting films.

13 Claims, 5 Drawing Sheets

(56) References Cited

FOREIGN PATENT DOCUMENTS

| | | |
|---|---|---|
| JP | 05-119302 A | 5/1993 |
| JP | H06-11694 A | 1/1994 |
| JP | 07-098443 A | 4/1995 |
| JP | 08-292419 A | 11/1996 |
| JP | 09-127492 A | 5/1997 |
| JP | 11-249105 A | 9/1999 |
| JP | 11326911 | 11/1999 |
| JP | H11-326911 A | 11/1999 |
| JP | 2000-098354 A | 4/2000 |
| JP | 2000-321562 A | 11/2000 |
| JP | 2001-83496 A | 3/2001 |
| JP | 2001-146589 A | 5/2001 |
| JP | 2004-163867 A | 6/2004 |
| JP | 2005-266744 A | 9/2005 |
| JP | 2010-002506 A | 1/2010 |
| KR | 19960035121 | 10/1996 |
| WO | 2008-126512 A | 10/2008 |

OTHER PUBLICATIONS

First Office Action issued in Chinese Patent Application No. 201280053334.4 on Nov. 4, 2015 along with English translation, 14 pages.

* cited by examiner

LIGHT

LIQUID CRYSTAL CELL

This application is a Utility Application which claims priority to and the benefit of Korean Patent Application Nos. 10-2011-0087945, filed on Aug. 31, 2011 and 10-2012-0096135, filed on Aug. 31, 2012, which are hereby incorporated by reference in their entirety herein.

FIELD

The present application relates to a liquid crystal cell, a precursor of the liquid crystal layer, a method of manufacturing a liquid crystal cell, and use of the liquid crystal cell.

BACKGROUND

A liquid crystal display device (LCD) displays an image by aligning a nematic or smectic liquid crystal compound in a certain direction and switching the alignment by applying voltage. A process for manufacturing an LCD is a highly expensive process having complicated procedures, thereby requiring installation of large production lines and facilities.

In the methods presented in order to solve the problems regarding the process for manufacturing an LCD, a so-called polymer dispersed liquid crystal (PDLC, the term PDLC used in this specification refers to a so-called superordinate concept including polymer network liquid crystals (PNLCs) or polymer stabilized liquid crystals (PSLCs)) device, which is realized by dispersing liquid crystals in a polymer matrix, has been known in the related art. Since the PDLCs may be manufactured by coating a liquid crystal solution, the PDLCs may be obtained through a simple process.

A liquid crystal compound is generally present so that the liquid crystal compound is not aligned in the PDLCs. Therefore, the PDLCs remain opaque when a voltage is not applied to the PDLCs. When a voltage is applied to the PDLCs, the liquid crystal compound is aligned according to the alignment of the PDLCs. As a result, the PDLCs become transparent. This indicates that the switching between opacity and transparency is possible. However, the PDLCs have a considerably reduced contrast ratio, compared to typical LCDs in which white and black are switched between two polarizing plates.

SUMMARY

The present application provides a liquid crystal cell, a precursor of the liquid crystal layer, a method of manufacturing a liquid crystal cell, and use of the liquid crystal cell.

One illustrative liquid crystal cell includes a liquid crystal layer. In the above, the liquid crystal layer may include an alignable network and a liquid crystal domain. The liquid crystal domain may include a liquid crystal compound, and may be included in the alignable network.

The term "liquid crystal domain" as used herein may refer to a domain which includes a liquid crystal compound, and which is phase-separated from and is dispersed in the alignable network.

The alignable network may be a network of a precursor including an alignable compound. The term "network of the precursor including the alignable compound" as used herein may refer to a polymer network including the precursor including the alignable compound, or a polymer network including cross-linked or polymerized product of the precursor.

The term "alignable compound" as used herein may, for example, refer to a compound which is capable of being orientationally ordered by, for example, being irradiated with light, and then is capable of aligning adjacent liquid crystal compounds to a predetermined direction through an interaction such as an anisotropic interaction under a state where it is orientationally ordered. The compound may be a single-molecule compound, a monomeric compound, an oligomeric compound or a polymeric compound. For example, a photo-alignable compound may be used as the alignable compound. The term "photo-alignable compound" as used herein may refer to a compound which is capable of being orientationally ordered by being irradiated with light such as linearly polarized light, and then is capable of aligning adjacent liquid crystal compounds.

The photo-alignable compound may be a compound including a photosensitive moiety. A variety of photo-alignable compounds that may be used for alignment of the liquid crystal compound have been widely known in the related art. For example, the photo-alignable compound that may be used herein may include a compound capable of being ordered by trans-cis photoisomerization; a compound capable of being ordered by photo-destruction such as chain scission or photo-oxidation; a compound capable of being ordered by photo-crosslinking or photo-polymerization such as [2+2] cycloaddition, [4+4] cycloaddition or photodimerization; a compound capable of being ordered by photo-Fries rearrangement; or a compound capable of being ordered by a ring opening/closure reaction. Examples of the compound capable of being ordered by the trans-cis photoisomerization may include an azo compound such as a sulfonated diazo dye or an azo polymer, or a stilbene compound, and examples of the compound capable of being ordered by the photo-destruction may include cyclobutane-1,2,3,4-tetracarboxylic dianhydride, aromatic polysilane or polyester, polystyrene, or polyimide. Also, examples of the compound capable of being ordered by the photo-crosslinking or photo-polymerization may include a cinnamate compound, a coumarin compound, a cinnamamide compound, a tetrahydrophthalimide compound, a maleimide compound, a benzophenone compound, a diphenylacetylene compound, a compound (hereinafter referred to as a "chalcone compound") including a chalconyl moiety as a photosensitive moiety, or a compound (hereinafter referred to as a "anthracenyl compound") including an anthracenyl moiety, the compound capable of being ordered by the photo-Fries rearrangement may include an aromatic compound such as a benzoate compound, a benzoamide compound, or a (meth)acrylamidoaryl(meth)acrylate compound, and the compound capable of being ordered by the ring opening/closure reaction may include a compound, such as a spiropyran compound, which is capable of being ordered by a ring opening/closure reaction of a [4+2] π-electronic system, but it is not limited thereto.

The photo-alignable compound may be a single-molecule compound, a monomeric compound, an oligomeric compound or a polymeric compound, or may be in the form of a blend of the above-described photo-alignable compound and a polymer. As such, the oligomeric or polymeric compound may have the above-described photosensitive moiety or a moiety derived from the above-described photo-alignable compound. In this case, the photo-alignable compound-derived moiety or photosensitive moiety may be in the main chain or the side chain of the oligomeric or polymeric compound.

Examples of the polymer which has the photo-alignable compound-derived moiety or photosensitive moiety or may be mixed with the photo-alignable compound may include polynorbornene, polyolefin, polyarylate, polyacrylate, poly(meth)acrylate, polyimide, poly(amic acid), polymaleimide, polyacrylamide, poly(meth)acrylamide, polyvinyl ether, polyvinyl ester, polystyrene, polysiloxane, polyacrylonitrile or poly(meth)acrylonitrile, but is not limited thereto.

Representative examples of the polymer that may be included in the alignable compound may include polynorbornene cinnamate, polynorbornene alkoxy cinnamate, polynorbornene allyloyloxy cinnamate, polynorbornene fluorinated cinnamate, polynorbornene chlorinated cinnamate or polynorbornene dicinnamate, but it is not limited thereto.

When the alignable compound is the polymeric compound, the compound may have a number average molecular weight in a range, for example, from approximately 10,000 g/mol to 500,000 g/mol, but it is not limited thereto.

In the alignable network, the alignable compound may be orientationally ordered, and the liquid crystal compound in the liquid crystal domain may be aligned by the orientationally ordered network under a state where any voltage is not applied.

For example, the alignable compound may be simply included in the alignable network under a state where it is orientationally ordered, or may be cross-linked and/or polymerized under a state it is orientationally ordered, so as to form the alignable network.

The alignable compound may include at least one cross-linkable or polymerizable functional group so that the alignable compound may be cross-linked or polymerized so as to form the alignable network. For example, a functional group which may react by application of heat or irradiation with active energy beam such as ultraviolet (UV) rays may be used as the cross-linkable or polymerizable functional group. Examples of such a functional group may include a hydroxyl group, a carboxyl group, an alkenyl group such as a vinyl group or an allyl group, an epoxy group, an oxetanyl group, a vinyl ether group, a cyano group, an acryloyl group, a (meth)acryloyl group, an acryloyloxy group, or a (meth)acryloyloxy group, but it is not limited thereto. For example, the above-described functional group may include a functional group that is capable of taking part in a radical or cationic reaction induced by application of heat or irradiation with active energy beam, or a cross-linking or polymerization reaction induced under a base environment. Such a functional group may be, for example, introduced into the main chain or side chain of the alignable compound.

The precursor for forming the alignable network may further include a cross-linking agent. The cross-linking agent may be added to control an afterimage or strength of the liquid crystal cell. For example, a compound which can react with the alignable compound by application of heat or irradiation with active energy beam so as to form a cross-linking structure may be used as the cross-linking agent. A variety of cross-linking agents that can form a cross-linking structure according to the kinds of polymer compounds are known in the related art. For example, examples of the cross-linking agent may include a multifunctional compound containing at least two functional groups, for example, an isocyanate compound, an epoxy compound, an isothiocyanate compound, a vinyl ether compound, an alcohol, an amine compound, a thiol compound, a carboxylic compound, an aziridine compound, or a metal chelate compound.

For example, a compound including at least two groups selected from the group consisting of an alkenyl group such as a vinyl group or an allyl group, an epoxy group, an oxetanyl group, a vinyl ether group, an acryloyl group, a (meth)acryloyl group, an acryloyloxy group and a (meth)acryloyloxy group may also be used as the cross-linking agent that can take part in the cross-linking reaction by irradiation with active energy beam such as UV rays. Representative examples of the compound that may be used herein may include a multifunctional acrylate. Examples of the multifunctional acrylate may include trimethylolpropane tri(meth)acrylate, pentaerythritol tri(meth)acrylate, pentaerythritol tetra(meth)acrylate, dipentaerythritol penta(meth)acrylate, dipentaerythritol hexa(meth)acrylate, triglycerol di(meth)acrylate, tripropyleneglycol di(meth)acrylate, tetraethyleneglycol di(meth)acrylate, pentaerythritol di(meth)acrylate, 1,6-hexanediol di(meth)acrylate, glycerol di(meth)acrylate, tris[2-(acryloyloxy)ethyl]isocyanurate, urethane acrylate, glycerol 1,3-diglycerolate di(meth)acrylate, or tri(propyleneglycol)glycerolate diacrylate, but it is not limited thereto.

The cross-linking agent may be included at a proper ratio in consideration of a control level of the afterimage, a degree of imparting the strength, phase-separation characteristics and anchoring characteristics of the liquid crystal domain and the alignable network, photosensitivity, the dielectric constant, and the refractive index. For example, the precursor of the alignable network may include a cross-linking agent in an amount of 0.1 parts by weight to 100 parts by weight, 5 parts by weight to 100 parts by weight, 10 parts by weight to 90 parts by weight, 10 parts by weight to 80 parts by weight, 10 parts by weight to 70 parts by weight, 10 parts by weight to 60 parts by weight, or 10 parts by weight to 50 parts by weight, relative to 100 parts by weigh of the alignable compound. The amount of the cross-linking agent may vary according to the kinds of the cross-linking agent and the alignable compound used. Unless particularly stated otherwise in this specification, the unit "part(s) by weight" may refer to a weight ratio between components.

The precursor of the alignable network may include an additive such as a solvent, a radical or cationic initiator, a basic material, the other reactive compounds capable of forming a network, or a surfactant, if necessary.

Along with the liquid crystal compound of the liquid crystal domain, the alignable network may satisfy the following Expression 1.

$$(1-a) \times \{(2n_o^2 + n_e^2)/3\}^{0.5} < n_p < (1+a) \times \{(2n_o^2 + n_e^2)/3\}^{0.5} \quad \text{[Expression 1]}$$

In Expression 1, the "$n_p$" represents a refractive index of the alignable network, the "$n_o$" represents an ordinary refractive index of the liquid crystal compound, the "$n_e$" represents an extraordinary refractive index of the liquid crystal compound, and a represents a value satisfying the expression: $0 \leq a < 0.5$.

The refractive index may be, for example, a refractive index measured with respect to light having a wavelength of 550 nm. Also, when the ordinary refractive index and the extraordinary refractive index of the alignable network are different, the term "refractive index" of the alignable network as used herein may refer to an ordinary refractive index of the alignable network. The alignable network and the liquid crystal compound may be selected so that the alignable network and the liquid crystal compound can satisfy Expression 1. In this case, a device having excellent transparency and high contrast ratio in the absence of an applied voltage may be provided.

In Expression 1, the "a" is, for example, less than 0.4, less than 0.3, less than 0.2, or less than 0.1, or may be 0.

Also, the alignable network may have a dielectric constant of 3 or more, 3.5 or more, or 4 or more. The excellent driving voltage characteristics of the liquid crystal cell may be maintained within this dielectric constant range. The upper limit of the dielectric constant is not particularly limited, and may be, for example, approximately 20 or less, 15 or less, or 10 or less.

The liquid crystal domain dispersed in the alignable network includes a liquid crystal compound. All kinds of liquid crystal compounds may be used without limitation as long as they can be phase-separated in the alignable network and remain aligned by the alignable network. For example, a smectic liquid crystal compound, a nematic liquid crystal compound or a cholesteric liquid crystal compound may be used as the liquid crystal compound. The liquid crystal compound is phase-separated, and is not bound to the alignable network. Thus, the alignment of the liquid crystal compound may be altered when a voltage is applied from the outside. To this end, the liquid crystal compound may be, for example, a compound having no polymerizable or cross-linkable group.

In one embodiment, a nematic liquid crystal compound may be used as the liquid crystal compound. For example, a nematic liquid crystal compound satisfying the following Expression 2 may be used as the liquid crystal compound.

$$(1.53-b) < \{(2n_o^2 + n_e^2)/3\}^{0.5} < (1.53+b)$$ [Expression 2]

In Expression 2, the "$n_o$" represents an ordinary refractive index of the liquid crystal compound as defined in Expression 1, for example, a refractive index of the shorter axis direction of the nematic liquid crystal compound, the "$n_e$" represents an extraordinary refractive index of the liquid crystal compound as defined in Expression 1, for example, a refractive index of the longer axis direction of the nematic liquid crystal compound, and b represents a value satisfying the expression: $0.1 \leq b \leq 1$.

The liquid crystal compound satisfying Expression 2 may be selected to manufacture a liquid crystal cell having excellent transparency even in the absence of an applied voltage.

In another embodiment, the "b" in the Expression 2 may be in a range from 0.1 to 0.9, from 0.1 to 0.7, from 0.1 to 0.5, or from 0.1 to 0.3.

Also, the liquid crystal compound has a difference between an extraordinary dielectric constant ($\in_e$; a dielectric constant of the longer axis direction) and an ordinary dielectric constant ($\in_o$; a dielectric constant of the shorter axis direction) of 3 or more, 3.5 or more, 4 or more, 6 or more, 8 or more, or 10 or more. When the liquid crystal compound has such a dielectric constant, a device having excellent driving voltage characteristics may be provided. As the difference in dielectric constant become higher, a device having more proper characteristics may be provided. Here, the upper limit of the difference in dielectric constant is not particularly limited. For example, a compound having an extraordinary dielectric constant ($\in_e$; a dielectric constant of the longer axis direction) of approximately 6 to 50 and an ordinary dielectric constant ($\in_o$; a dielectric constant of the shorter axis direction) of approximately 2.5 to 7 may be used as the liquid crystal compound.

In the liquid crystal cell, the liquid crystal compound of the liquid crystal domain may be included in an amount of 100 parts by weight to 2,500 parts by weight, 100 parts by weight to 2,000 parts by weight, 100 parts by weight to 1,900 parts by weight, 100 parts by weight to 1,800 parts by weight, 100 parts by weight to 1,700 parts by weight, 100 parts by weight to 1,600 parts by weight, 100 parts by weight to 1,500 parts by weight, 100 parts by weight to 1,400 parts by weight, 100 parts by weight to 1,300 parts by weight, 100 parts by weight to 1,200 parts by weight, 100 parts by weight to 1,100 parts by weight, 100 parts by weight to 1,000 parts by weight, 100 parts by weight to 900 parts by weight, 100 parts by weight to 800 parts by weight, 100 parts by weight to 700 parts by weight, 100 parts by weight to 600 parts by weight, 100 parts by weight to 500 parts by weight, 100 parts by weight to 400 parts by weight, 100 parts by weight to 300 parts by weight, or 150 parts by weight to 250 parts by weight, relative to 100 parts by weight of the alignable network. The amount of the liquid crystal compound may vary according to the necessity.

For example, the liquid crystal cell may show excellent transparency even when a voltage is not applied. For example, the liquid crystal cell may have a light transmittance of 80% or more, 85% or more, 90% or more, or 95% or more in the absence of an applied voltage. The light transmittance may be a light transmittance with respect to a visible region, for example, a wavelength in a range from approximately 400 nm to 700 nm.

The liquid crystal cell may further include one or two or more substrate layers. The liquid crystal layer may be formed on a surface of the substrate layer, or formed between two or more substrate layers. For example, the liquid crystal cell may further include substrate layers facing each other, and the liquid crystal layer may be between the facing substrate layers. FIG. 1 shows a schematic of one illustrative embodiment of a liquid crystal cell including a liquid crystal layer 102 which is between substrate layers 101A and 101B spaced predetermined distances apart to face each other and includes an alignable network 1021 and a liquid crystal domain 1022. In the liquid crystal domain 1022, the liquid crystal compound is indicated by arrows as shown in FIG. 1.

Materials known in the related art may be used as the substrate layer without limitation. For example, an inorganic film such as a glass film, a crystalline or amorphous silicon film, or quartz or indium tin oxide (ITO) film, or a plastic film may be used as the substrate layer. An optically isotropic substrate layer, an optically anisotropic substrate layer such as a retardation layer, a polarizing plate, or a color filter substrate may be used as the substrate layer. Examples of the plastic substrate layer that may be used herein may include a substrate layer including triacetyl cellulose (TAC); a cycloolefin copolymer (COP) such as a norbornene derivative; poly(methyl methacrylate (PMMA); polycarbonate (PC); polyethylene (PE); polypropylene (PP); polyvinyl alcohol (PVA); diacetyl cellulose (DAC); polyacrylate (Pac); polyether sulfone (PES); polyetheretherketone (PEEK); polyphenylsulfone (PPS); polyetherimide (PEI); polyethylene naphthalate (PEN); polyethylene terephthalate (PET); polyimide (PI); polysulfone (PSF); polyarylate (PAR); or an amorphous fluororesin, but is not limited thereto. The substrate layer may include a coating layer formed of gold, silver, or a silicon compound such as silicon dioxide or silicon monoxide, or a coating layer such as an anti-reflection layer, if necessary.

An electrode layer may be included on a surface of the substrate layer, for example, a surface of the substrate layer at a side of the liquid crystal layer (for example, a surface of the substrate layer 101A or 101B in contact with the liquid crystal layer 102 as shown in FIG. 1). For example, the electrode layer may be formed by depositing a conductive polymer, a conductive metal, a conductive nano-wire, or a metal oxide such as ITO. The electrode layer may be formed transparent. In the related art, various materials and methods used to form a transparent electrode layer are known. These methods are all applicable. If necessary, the electrode layer formed on a surface of the substrate layer may be properly patterned.

Also, the liquid crystal cell may further include a polarizing plate(s) positioned at one or both sides of the liquid crystal layer. Conventional materials used for conventional LCDs may be used for the polarizing plate without limitation. When the polarizing plates are disposed at both sides of the liquid crystal cell, for example, the polarizing plates may be disposed so that the light absorption axes of the polarizing plates may be perpendicular to each other.

The present application also relates to a precursor capable of forming the liquid crystal layer as described above. One illustrative precursor may include a precursor of the alignable network and a liquid crystal compound. The precursor of the alignable network may include the alignable compound, for example, the photo-alignable compound. The precursor of the alignable compound may form the alignable network, and the liquid crystal compound may be phase-separated from the alignable network during formation of the network to form the liquid crystal domain.

The above-described compound, for example, a photo-alignable compound, or a precursor compound capable of forming the photo-alignable compound may be used as the alignable compound. Also, the same compound as already described above may be used as the liquid crystal compound. The precursor may further include the cross-linking agent as a compound capable of forming the alignable network along with the alignable compound if necessary. The alignable compound, the cross-linking agent and the liquid crystal compound are applicable in the same kinds and ratios as in the above-described contents.

For example, the precursor of the alignable network and the liquid crystal compound may satisfy the following Expression 1.

$$(1-a) \times \{(2n_o^2+n_e^2)/3\}^{0.5} < n_p < (1+a) \times \{(2n_o^2+n_e^2)/3\}^{0.5} \quad \text{[Expression 1]}$$

In Expression 1, the "$n_p$" represents a refractive index of the alignable network formed from the precursor, the "$n_o$" represents an ordinary refractive index of the liquid crystal compound, the "$n_e$" represents an extraordinary refractive index of the liquid crystal compound, and the "a" represents a value satisfying the expression: $0 \leq a < 0.5$.

In Expression 1, the "a" may be in a range of, for example, less than 0.4, less than 0.3, less than 0.2, or less than 0.1, or may be 0.

Also, the precursor of the alignable network may be selected so that the precursor can form a network having a dielectric constant of 3 or more, 3.5 or more, or 4 or more.

In addition, the liquid crystal compound may be a nematic liquid crystal compound, and may be, for example, a nematic liquid crystal compound satisfying the following Expression 2.

$$(1.53-b) < \{(2n_o^2+n_e^2)/3\}^{0.5} < (1.53+b) \quad \text{[Expression 2]}$$

In Expression 2, the "$n_o$" represents an ordinary refractive index of the liquid crystal compound, for example, a refractive index of the shorter axis direction of the nematic liquid crystal compound, the "$n_e$" represents an extraordinary refractive index of the liquid crystal compound, for example, a refractive index of the longer axis direction of the nematic liquid crystal compound, and the "b" represents a value satisfying the expression: $0.1 \leq b \leq 1$.

In another embodiment, the "b" in Expression 2 may be in a range of 0.1 to 0.9, 0.1 to 0.7, 0.1 to 0.5, or 0.1 to 0.3.

Also, the liquid crystal compound may have a difference between an extraordinary dielectric constant ($\in_e$; a dielectric constant of the longer axis direction) and an ordinary dielectric constant ($\in_o$; a dielectric constant of the shorter axis direction) of 3 or more, 3.5 or more, 4 or more, 6 or more, 8 or more, or 10 or more. When the liquid crystal compound has such a dielectric constant, a device having excellent driving voltage characteristics may be provided. In this case, a compound having an extraordinary dielectric constant ($\in_e$; a dielectric constant of the longer axis direction) of approximately 6 to 50 and an ordinary dielectric constant ($\in_o$; a dielectric constant of the shorter axis direction) of approximately 2.5 to 7 may be used as the liquid crystal compound.

The liquid crystal compound in the precursor may be included in an amount of 100 parts by weight to 2,500 parts by weight, 100 parts by weight to 2,000 parts by weight, 100 parts by weight to 1,900 parts by weight, 100 parts by weight to 1,800 parts by weight, 100 parts by weight to 1,700 parts by weight, 100 parts by weight to 1,600 parts by weight, 100 parts by weight to 1,500 parts by weight, 100 parts by weight to 1,400 parts by weight, 100 parts by weight to 1,300 parts by weight, 100 parts by weight to 1,200 parts by weight, 100 parts by weight to 1,100 parts by weight, 100 parts by weight to 1,000 parts by weight, 100 parts by weight to 900 parts by weight, 100 parts by weight to 800 parts by weight, 100 parts by weight to 700 parts by weight, 100 parts by weight to 600 parts by weight, 100 parts by weight to 500 parts by weight, 100 parts by weight to 400 parts by weight, 100 parts by weight to 300 parts by weight, or 150 parts by weight to 250 parts by weight, relative to 100 parts by weight of the precursor. The amount of the liquid crystal compound may be properly varied, as necessary.

The precursor may further include a solvent, as necessary. The solvent that may be used herein is not particularly limited. For example, the precursor may be properly selected from known kinds of solvents such as toluene, xylene, cyclopentanone and cyclohexanone.

To facilitate a network-forming reaction of the alignable compound and/or cross-linking agent, the precursor may also further include a proper additive such as a radical or cationic initiator, a catalyst such as an amine, or another reactive compound or surfactant capable of forming a network, as necessary.

The present application also relates to a method of manufacturing a liquid crystal cell. For example, the method of manufacturing a liquid crystal cell may include irradiating a layer of the precursor with light. Irradiating the layer of the precursor with light may induce the above described alignment, cross-linking and/or polymerization of the alignable compound and the phase-separation of the liquid crystal compound.

The layer of the precursor may be formed by coating a proper substrate, for example, the substrate layer, with the precursor. For example, when the precursor is in a liquid phase, the layer of the precursor may be formed using a conventional coating method such as bar coating, comma coating, inkjet coating or spin coating. For example, the above-described transparent electrode layer may be formed on a surface of the substrate layer having the layer of the precursor formed thereon.

After formation of the layer of the precursor, the layer of the precursor may be irradiated with light. When the solvent is included in the precursor, for example, irradiation with light may be performed after the formed layer is dried under proper conditions to volatilize the solvent. Such drying may be, for example, performed at a temperature of approximately 80° C. to 130° C. for approximately 1 to 10 minutes, but is not limited thereto.

The irradiation with light may be performed so as to align the alignable compound in the layer of the precursor. In general, the alignable compound may be aligned by linearly polarized light. The wavelength or intensity of light to be irradiated may be chosen to provide proper alignment of the alignable compound. Typically, the alignable compound, for example, the photo-alignable compound, may be aligned using light with a visible or near-ultraviolet range. As necessary, the alignable compound may be aligned using light with a far-ultraviolet or near-infrared range.

Irradiating with light may be performed under a state where the liquid crystal compound is in an isotropic state. FIG. 2 shows a schematic of one illustrative embodiment showing a procedure of irradiating a layer 201 of the precursor, which is formed on the substrate layer 1011 and includes a liquid crystal compound (indicated by an arrow) in the isotropic state, with light. To maintain the liquid crystal compound in the isotropic state, for example, the irradiation with light may be performed at an isotropic transition temperature ($T_{NI}$) of the liquid crystal compound, or a temperature higher than the isotropic transition temperature ($T_{NI}$).

The alignable compound may be orientationally ordered by the irradiation with light, and the liquid crystal compound dispersed in the alignable compound may be aligned along an alignment direction of the alignable compound. FIG. 3 shows a schematic of one illustrative embodiment showing a liquid crystal layer 102 including the alignable network 1021 and the liquid crystal domain 1022, all of which are formed on the substrate layer 1011 after irradiation with light.

To facilitate the formation of the alignable network, a proper heat application or light exposure process may be performed before or after the irradiation with light, or performed at the same time as the irradiation with light, as necessary.

After the liquid crystal layer is formed through the above-described process, an additional substrate layer, for example, a substrate layer having a transparent electrode layer formed one a surface thereof, may be attached to the formed liquid crystal layer, as necessary, to form a device having the structure as shown in FIG. 1.

The method of manufacturing a liquid crystal cell as described above may be performed in a consecutive manner, for example, using a roll-to-roll process.

The present application also relates to uses of the liquid crystal cell. For example, illustrative liquid crystal cell may be manufactured simply in a consecutive manner using a roll-to-roll process. Also, the liquid crystal cell may be realized as a flexible device, and may have an excellent contrast ratio.

Such a liquid crystal cell may be applied in various applications, for example, including smart windows, window-protecting films, flexible display devices, active retarders for displaying 3D images, or viewing angle-adjusting films.

Effect

Illustrative liquid crystal cell may be manufactured simply in a consecutive manner using a roll-to-roll process. Also, the liquid crystal cell may be realized as a flexible device, and have an excellent contrast ratio. Such a liquid crystal cell can be applied in various applications including, for example, smart windows, window-protecting films, flexible display devices, active retarders for displaying 3D images, or viewing angle-adjusting films.

MARKS IN DRAWING 101A, 101B, 1011: the substrate layers
102: the liquid crystal layer
201: the layer of the precursor
1021: the alignable network
1022: the liquid crystal domain

DETAILED DESCRIPTION OF EXEMPLARY EMBODIMENTS

Hereinafter, the liquid crystal cell will be described in further detail with reference to Example. However, it should be understood that the scope of the liquid crystal cell is not intended to be limited by the following examples.

Examples 1

Preparation of Precursor 7 g of a liquid crystal compound (ZGS-8017, JNC, extraordinary refractive index: approximately 1.597, and ordinary refractive index: approximately 1.487), 3 g of a polynorbornene-fluorinated cinnamate compound (PNBCi, weight average molecular weight: 85,000, and polydispersity index (PDI): approximately 4.75) including the repeating unit represented by the following Formula 1 as the alignable compound, and 1 g of a ultraviolet-curable compound (NOA-65, Norland Optical Adhesive 65) were blended with 100 g of toluene. Then, a proper amount of an initiator was blended with the resulting mixture to prepare a precursor.

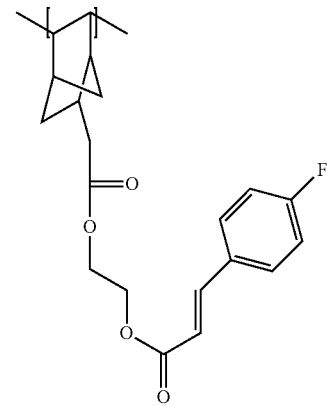

[Formula 1]

Manufacture of Liquid Crystal Cell

An electrode layer of a transparent polycarbonate substrate layer having an ITO transparent electrode layer formed on a surface thereof was coated with the prepared precursor using a bar coater, and a solvent (toluene) was volatilized to form a layer of the precursor having a thickness of approximately 7 μm. Thereafter, the layer of the precursor was positioned on a hot plate having a wire grid polarizer (WGP) disposed thereon, and a temperature of the hot plate was set to 90° C. The temperature of the hot plate was maintained until the layer of the precursor became transparent, and the transparent layer of the precursor was irradiated with linearly polarized ultraviolet rays (1,200 mJ/cm$^2$) by means of the WGP so as to form a liquid crystal layer including an alignable network and a liquid crystal domain. A refractive index measured for the formed alignable network using a prism coupler was approximately 1.573. Then, one surface of an ITO transparent electrode layer of a polycarbonate film having an ITO transparent electrode layer formed on a surface thereof was attached to the formed liquid crystal layer to manufacture a liquid crystal cell.

Experiment Example 1

Figure 1:
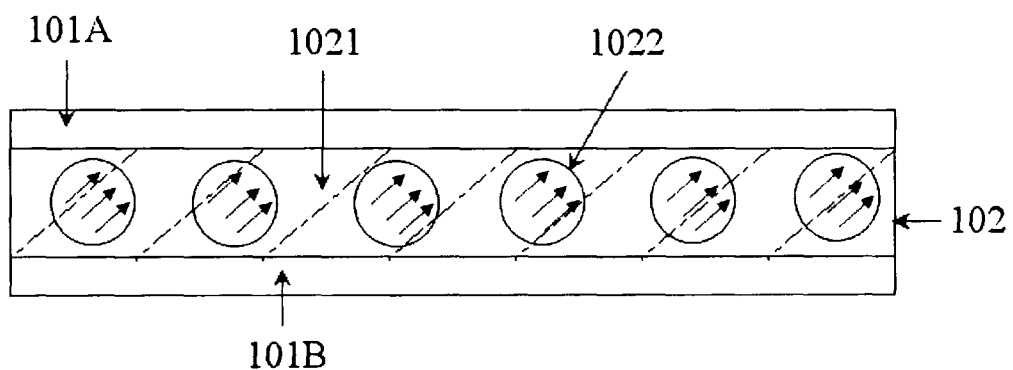
FIG. 1 shows a schematic of one illustrative embodiment of the liquid crystal cell.
Figure 2:
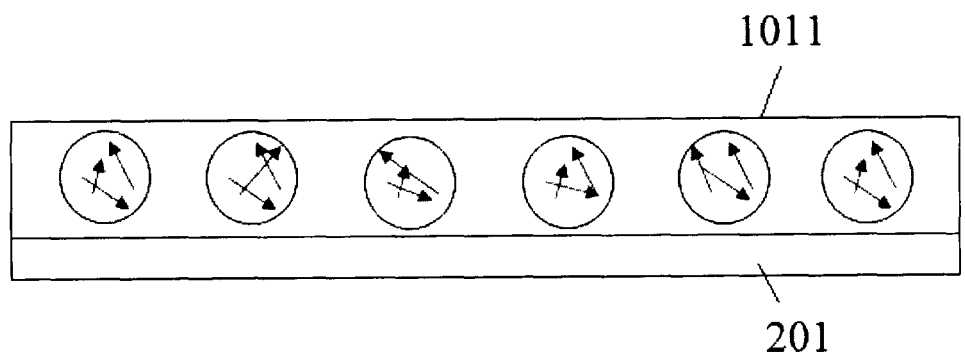
FIGS. 2 and 3 show schematics of illustrative embodiments showing a process for manufacturing a liquid crystal cell.
Figure 3:
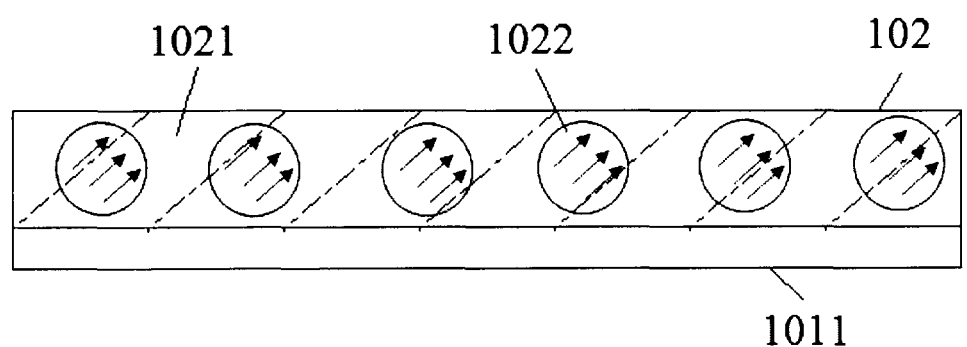
Figure 4:
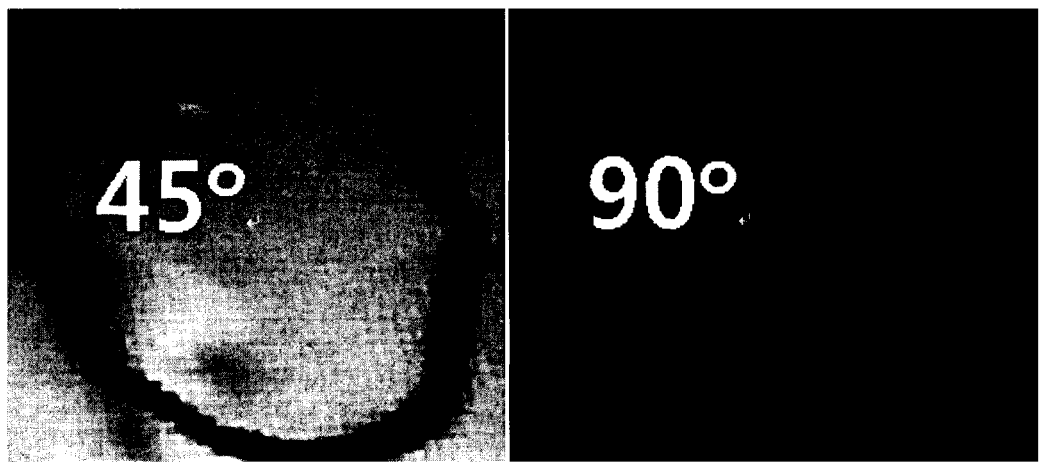
FIG. 4 is a diagram showing a change in brightness between two polarizing plates of a liquid crystal cell prepared in Example.

The liquid crystal cell manufactured in Example 1 was disposed between two polarizing plates (upper and lower polarizing plates) which were arranged so that the light absorption axes of the polarizing plates were perpendicular to each other. The brightness of the liquid crystal cell was evaluated by irradiating the lower polarizing plate with light while the liquid crystals of the liquid crystal cell were disposed so that an alignment direction of the liquid crystals was formed at an angle of 45 degrees or 90 degrees with respect to the light transmission axis of the upper polarizing plate. FIG. 4 is an image showing the evaluation results. Here, the left panel of FIG. 4 shows that the alignment direction of the liquid crystals is formed at an angle of 45 degrees with respect to the light transmission axis of the upper polarizing plate, and the right panel of FIG. 4 shows that the alignment direction of the liquid crystals is formed at an angle of 90 degrees with respect to the light transmission axis of the upper polarizing plate.

Experiment Example 2

Figure 5:
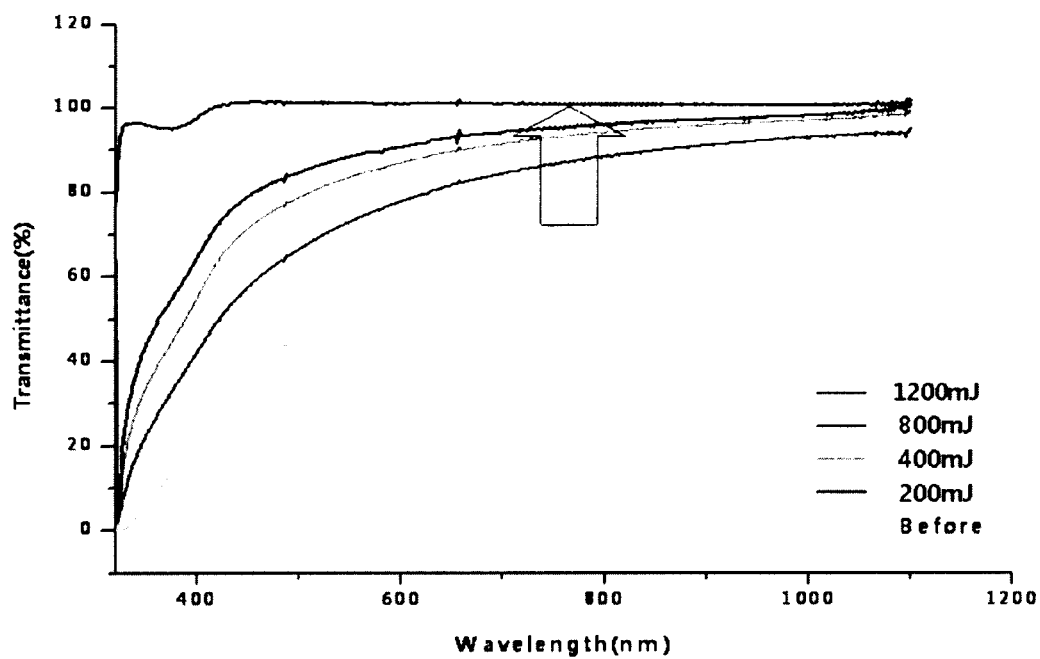
FIG. 5 is a graph illustrating the transmittance of the liquid crystal cell prepared in Example.

A liquid crystal cell was manufactured in the same manner as in Example 1, except that the liquid crystal cell was manufactured by altering an irradiation intensity of light. Thereafter, the transmittance of the liquid crystal cell was measured. The measurement results are shown in FIG. 5. As shown in FIG. 5, it could be seen that the transparency of the liquid crystal cell varied according to the ordering degree of the alignable network.

Experiment Example 3

Figure 6:
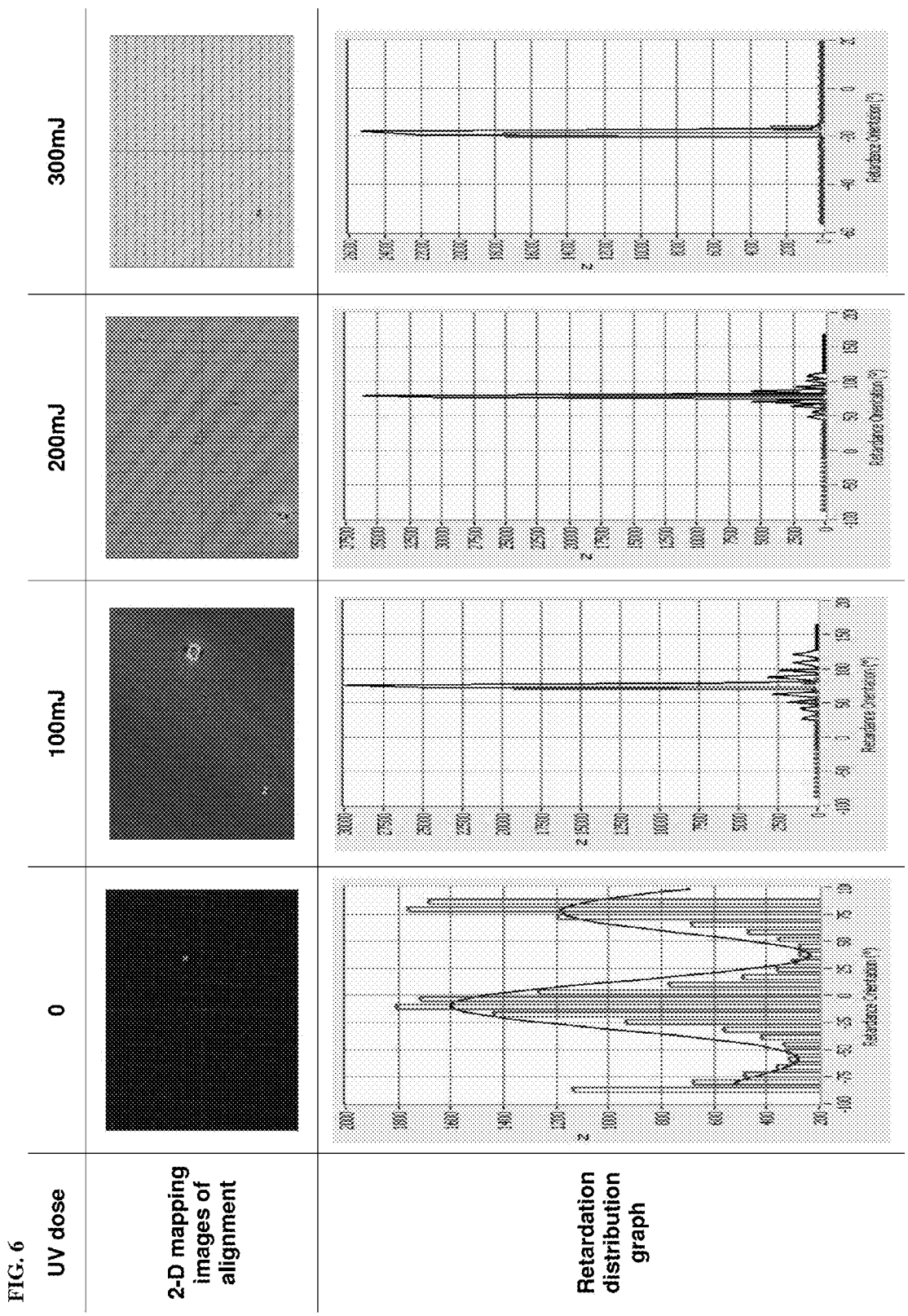
FIG. 6 is a diagram showing the phase difference of the liquid crystal cell prepared in Example according to rotation of polarized visible light.

A liquid crystal cell was manufactured in the same manner as in Example 1, except that the liquid crystal cell was manufactured by altering an irradiation intensity of light. Thereafter, the phase difference according to rotation of polarized visible light was evaluated according to the light exposure using an Axostep system. The evaluation results are shown in FIG. 6.

Experiment Example 4

Figure 7:
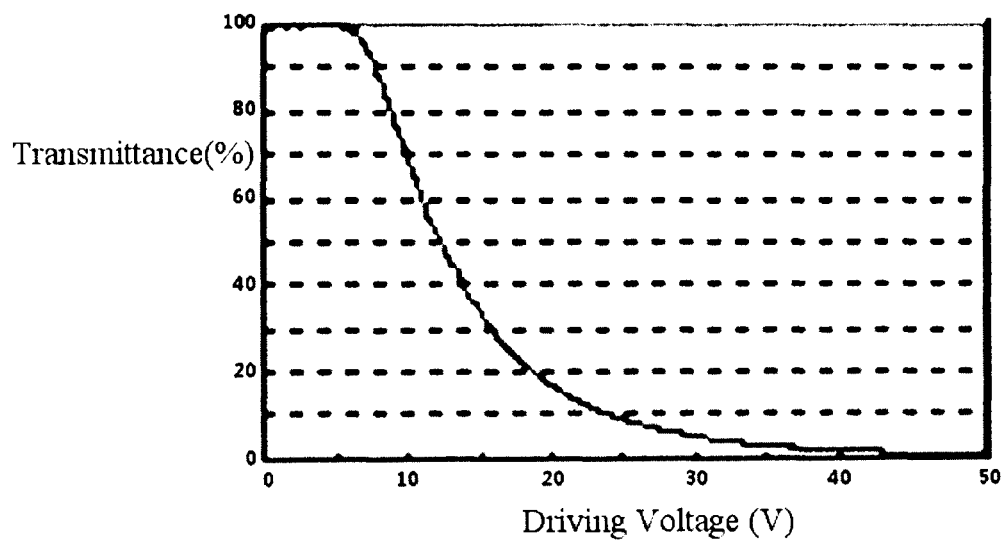
FIG. 7 is a graph obtained by measuring the contrast ratio of the liquid crystal cell prepared in Example.

The liquid crystal cell manufactured in Example 1 was disposed between two polarizing plates (upper and lower polarizing plates) which were arranged so that the light absorption axes of the polarizing plates were perpendicular to each other. The liquid crystal cell was disposed so that an alignment direction of the liquid crystal cell was formed at an angle of 45 degrees with respect to the light transmission axis of one of the two polarizing plates. Thereafter, an AC power source was connected to ITO transparent electrode layers of upper and lower substrate layers (polycarbonate films), and the transmittance of the liquid crystal cell was measured according the driving voltage using a photodiode laser. The measurement results are shown in FIG. 7. As shown in FIG. 7, it was confirmed that the liquid crystal cell manufactured in Example 1 showed a contrast ratio of approximately 400:1 at a voltage of approximately 43 V.

What is claimed is:

1. A method of manufacturing a liquid crystal cell, comprising irradiating a layer of a precursor of a liquid crystal layer with light that is linearly polarized,
    wherein the precursor of the liquid crystal layer comprises a precursor of an alignable network comprising a photo-alignable compound and a liquid crystal compound,
    wherein the liquid crystal layer comprises the alignable network and a liquid crystal domain that is in the alignable network and comprises the liquid crystal compound,
    wherein the liquid crystal cell has a light transmittance of 80% or more under a state where voltage is not applied,
    wherein the alignable network and the liquid crystal compound satisfy the following Expression 1:

$(1-a) \times \{(2n_o^2+n_e^2)/3\}^{0.5} < n_p < (1+a) \times \{(2n_o^2+n_e^2)/3\}^{0.5}$ [Expression 1]

wherein the "$n_p$" represents a refractive index of the alignable network formed from the precursor of the alignable network, the "$n_o$" represents an ordinary refractive index of the liquid crystal compound, the "$n_e$" represents an extraordinary refractive index of the liquid crystal compound, and the "a" represents a value satisfying $0 \leq a \leq 0.5$,
    and wherein the irradiating of the layer of the precursor with the light is performed at an isotropic transition temperature of the liquid crystal compound or a temperature greater than the isotropic transition temperature.

2. The method of claim 1, wherein the liquid crystal compound is a nematic liquid crystal compound satisfying the following Expression 2:

$(1.53-b) < \{(2n_o^2+n_e^2)/3\}^{0.5} < (1.53+b)$ [Expression 2]

wherein the "$n_o$" represents an ordinary refractive index of the liquid crystal compound, the "$n_e$" represents an extraordinary refractive index of the liquid crystal compound, and the "b" represents a value satisfying $0.1 \leq b \leq 1$.

3. The method of claim 1, wherein a difference ($\in_e - \in_o$) between an extraordinary dielectric constant ($\in_e$) and an ordinary dielectric constant ($\in_o$) of the liquid crystal compound is 3 or more.

4. A liquid crystal cell comprising a liquid crystal layer that comprises an alignable network which is a network of a precursor comprising a photo-alignable compound; and a liquid crystal domain that is in the alignable network and comprises a liquid crystal compound,
    wherein the liquid crystal cell is manufactured by the method of claim 1 and has a light transmittance of 80% or more under a state where voltage is not applied,
    and wherein the alignable network and the liquid crystal compound satisfy the following Expression 1:

$(1-a) \times \{(2n_o^2+n_e^2)/3\}^{0.5} < n_p < (1+a) \times \{(2n_o^2+n_e^2)/3\}^{0.5}$ [Expression 1]

wherein the "$n_p$" represents a refractive index of the alignable network, the "$n_o$" represents an ordinary refractive index of the liquid crystal compound, the "$n_e$" represents an extraordinary refractive index of the liquid crystal compound, and the "a" represents a value satisfying $0 \leq a < 0.5$.

5. The liquid crystal cell of claim 4, wherein the photo-alignable compound in the alignable network is in an orientationally ordered state, and the liquid crystal compound of the liquid crystal domain is aligned by the alignable network.

6. The liquid crystal cell of claim 4, wherein the photo-alignable compound is an azo compound, a stilbene compound, a cyclobutane tetracarboxylic dianhydride, an aromatic polysilane, an aromatic polyester, a polystyrene, a cinnamate compound, a coumarin compound, a cinnamamide compound, a tetrahydrophthalimide compound, a maleimide compound, a benzophenone compound, a diphenylacetylene compound, a chalcone compound, an anthracenyl compound, a benzoate compound, a benzoamide compound, a (meth)acrylamidoaryl (meth)acrylate compound or a spiropyran compound.

7. The liquid crystal cell of claim 4, wherein the alignable network has a dielectric constant of 3 or more.

8. The liquid crystal cell of claim 4, wherein the liquid crystal compound is a nematic liquid crystal compound satisfying the following Expression 2:

$$(1.53-b) < \{(2n_o^2 + n_e^2)/3\}^{0.5} < (1.53+b)$$ [Expression 2]

wherein the "$n_o$" represents an ordinary refractive index of the liquid crystal compound, the "$n_e$" represents an extraordinary refractive index of the liquid crystal compound, and the "b" represents a value satisfying $0.1 \leq b < 1$.

9. The liquid crystal cell of claim 4, wherein a difference ($\in_e - \in_o$) between an extraordinary dielectric constant ($\in_e$) and an ordinary dielectric constant ($\in_o$) of the liquid crystal compound is 3 or more.

10. The liquid crystal cell of claim 4, wherein the liquid crystal layer comprises 100 to 2,500 parts by weight of the liquid crystal compound, relative to 100 parts by weight of the alignable network.

11. The liquid crystal cell of claim 4, further comprising two substrate layers positioned so as to face to each other, and the liquid crystal layer being between the substrate layers.

12. The liquid crystal cell of claim 11, wherein an electrode layer is formed on a surface facing the liquid crystal layer of the substrate layer.

13. The liquid crystal cell of claim 4, further comprising polarizing plates on both sides of the liquid crystal layer.

* * * * *